May 12, 1959     F. R. SEAVEY     2,886,150

POWER TRANSMISSION MECHANISM

Filed June 4, 1956

INVENTOR
FREDERICK R. SEAVEY

ATTORNEYS.

United States Patent Office 2,886,150
Patented May 12, 1959

2,886,150

POWER TRANSMISSION MECHANISM

Frederick R. Seavey, Alton, Ill., assignor to Olin Mathieson Chemical Corporation, Alton, Ill., a corporation of Virginia Application June 4, 1956, Serial No. 589,154

4 Claims. (Cl. 192—21.5)

This invention relates to a power transmission mechanism and more particularly to a magnetic power transmission mechanism.

In rotatable power transmission systems, it is often necessary to provide a means for controlling the desired torque and for discontinuing the transmission of power through the system. It is also often desirable to maintain a constant torque. Magnetic power transmission mechanisms may be used in this environment both as a clutch and as a governor. These devices are usually controlled electrically by increasing or decreasing a magnetic field. Such electrical control systems require an external source of power which is not always available, and the use of electromagnets or other similar devices in the power transmission mechanism itself.

It is an object of this invention to provide a mechanically controlled magnetic power transmission mechnism.

Another object of this invention is to provide a mechanism for regulating the speed of a rotating power transmission system.

Another object of this invention is to provide a clutch for a rotating power transmission system.

Another object of this invention is to provide a clutch and speed control mechanism for a rotating power transmission system.

Another object of this invention is to provide a magnetic mechanism for controlling a rotating power transmission system wherein the magnetic control mechanism is mechanically operated.

Additional objects and advantages will be apparent from the following description and drawings in which.

This invention is directed to a magnetic control mechanism incorporating both a clutch and a speed control feature or either of these features independently. The mechanism increases or decreases a magnetic interlock between a driving and a driven member by shunting a magnetic flux, the amount of shunting being mechanically controlled.

Figure 1:
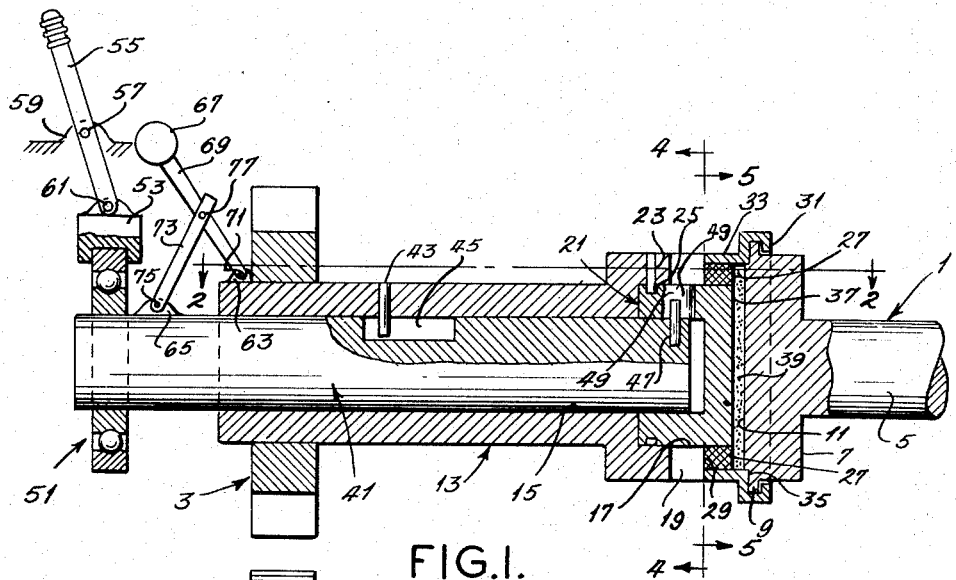
Figure 1 is a schematic sectional view of an embodiment of a magnetic control mechanism.
Figure 2:
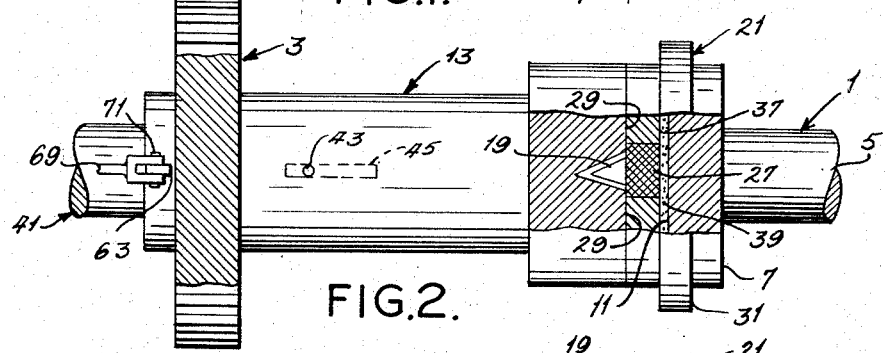
Figure 2 is a schematic sectional view taken on the line 2—2 in Figure 1.
Figure 3:
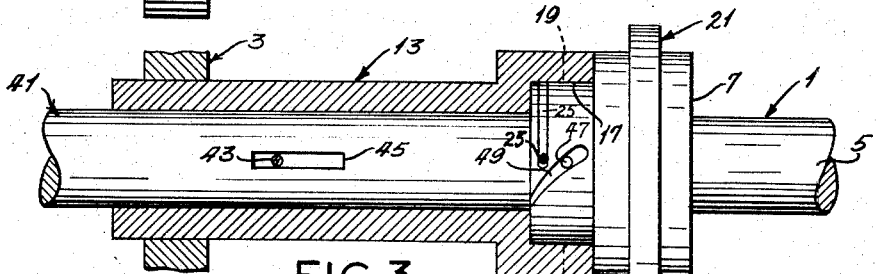
Figure 3 is a schematic top view of the mechanism, with a portion of the mechanism broken away.
Figure 4:
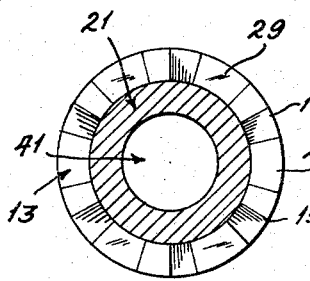
Figure 4 is a schematic sectional view taken on the line 4—4 in Figure 1.
Figure 5:
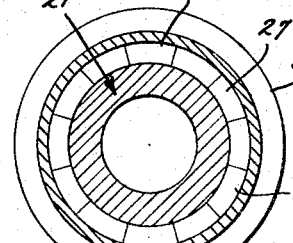
Figure 5 is a schematic sectional view taken on the line 5—5 in Figure 1.

Referring to the drawings, a driving member 1 is magnetically interlocked with a driven member 3. In this embodiment, the driving member 1 is a rotating shaft 5 having a paramagnetic cylindrical disc-like member 7 on one end and a radial flange 9 projecting from the rear end of the disc. The rear face 11 of the disc may be smooth. In this instance, the driven member 3 is a gear fixed to a paramagnetic housing 13. The housing 13 has a cylindrical bore 15 passing therethrough and a counterbore 17 at the front end thereof. The front end of the housing is provided with an angular magnetic pole array consisting of a plurality of gaps 19 and equally spaced pole faces 29 of angular span equal to that of the gaps. This end in the specific embodiment is furcated and is magnetized in any suitable manner such as by permanent magnets thereby providing a multiple-pole permanent magnet with adjacent poles of opposite polarity. A nonmagnetizable coupling disc 21 is nonrotatably received in the counterbore 17 of the housing 13 and may be nonrotatably maintained in the housing in any appropriate manner as by a set screw 23 fixed in the housing 13 and engaging a radial groove 25 in the coupling disc 21. A plurality of paramagnetic inserts or magnetic shunt elements 27, equal in number to the gaps 19 in the front end of the housing, are fixed in the coupling disc in concentric alignment with the array of pole faces. The inserts 27 are large enough to span the gaps 19 and overlie the front or pole faces 29 of the permanent magnet. The equally spaced pole faces 29 constitute substantially half the 360° span of the magnetic pole array (Figure 4) for obtainment of the widest range of coupling variable from substantially none to the very strongest. The forward end of the coupling disc 21 is provided with a radially extending interlocking means 31 which cooperates with the flange 9 on the driving disc 7 to maintain these members in the position shown in Figure 1. Adjacent the insert 27 the coupling disc 21 is provided with a longitudinally projecting cylindrical flange 33 which is received in a cut-out portion 35 of the driving disc. A void between the face 37 of the coupling member 21 and the face 11 of the driving disc may be filled with a colloidal iron suspension in oil 39. The suspension is sealed in the void in any appropriate manner. A nonmagnetizable rod 41 projects through the bore 15 in the housing 13. A pin 43 fixed in the housing 13 projects inwardly into a longitudinal groove 45 in the rod 41. The rod is free to move longitudinally in the bore 15, but is prevented by the pin 43 and the slot 45 from rotating with respect to the housing 13. A second pin 47 is fixed in the rod 41 and projects outwardly into a diagonal or helical groove 49 in the coupling disc 21. Longitudinal movement of the rod 41 causes the coupling disc 21 to rotate with respect to the housing 13, thus permitting selective placement of the inserts 27 in the coupling disc 21 with respect to the front faces 29 of the magnetized housing 13.

When the inserts 27 overlie the gaps 19 and are centered with respect thereto, the magnetic flux is shunted through the paramagnetic inserts 27. When the paramagnetic inserts 27 are aligned with the faces 29 of the magnetized housing 13, the magnetic flux is carried from the faces 29 through the inserts 27, through the suspension 39 and into the paramagnetic driving disc 7 on the rear end of the driving member 1 providing a magnetic interlock between the driving member 1 and the driven member 3. The slippage between the driving member 1 and the driven member 3 is controlled by the radial relative position of the inserts 27 with respect to the magnetized faces 29 and the gaps 19 in the magnetized housing 13. The relative position of these members may be adjusted to any desired degree, as will be more fully described hereinafter. It is desirable that the inserts 27 be large enough that when they are centered with the gaps 19 they will also overlie the faces 29, thus providing better shunting characteristics.

The inner race of bearing 51 is fixed to the rear end of the shaft 41 and the outer race is fixed to a nonrotating boss 53. A lever 55 is pivoted at 57 to a fixed member 59 and at 61 to the boss 53. Thus, by moving the lever rearwardly or forwardly, the rod 41 is moved longitudinally in the housing 13. The pin 47 in the groove 49 causes the coupling disc 21 and paramagnetic inserts 27 to rotate with respect to the faces 29 and gaps 19 of the magnetized housing 13. Mounted on the housing 13 is a boss 63 and a similar boss 65 is fixed to the rod 41. A heavy weight 67 is fixed to one end of a lever 69 and the other end of the lever is pivoted at 71 to the boss 63. A lever 73 has one end pivoted at 75 to the boss 65 and the other end is pivoted at 77 to the lever 69 at a point intermediate the weight 67 and the pivot 71. With the driving member 1 driving the driven member 3, the weight 67 will be moved inwardly or outwardly with respect to the rod 41 by the centrifugal force resulting from the rotating speed of the rod 41 and will find an equilibrium position. Should the speed of the driving member 1 be increased, the weight 67 will move outwardly causing the rod 41 to be moved forwardly toward the coupling disc 21 and this in turn will cause the coupling disc 21 to rotate, increasing the shunting action of the inserts 27, permitting more slippage between the disc 7 and the coupling disc 21, and reducing the rotatable speed of the housing 13 and rod 41 so that the weight 67 will move inwardly with respect to the rod 41 and find another position of equilibrium. Similarly, should the rotating assembly tend to slow down, the weight 67 will move inwardly with respect to the rod 41, rotating the inserts 27 into more nearly centered alignment with the magnetized faces 29 of the housing 13, increasing the magnetic interlock between the disc 7 and the coupling disc 21.

Although a preferred embodiment and various materials and details have been described herein, various changes will be apparent to one skilled in the art. It is to be noted that the terms "paramagnetic" and "nonmagnetizable" are used herein in their general sense and that the term "nonmagnetizable" is intended to encompass materials having relatively low paramagnetic or diamagnetic capacity. The invention is therefore not to be limited to such embodiments, materials, or details except as set forth in the appended claims.

I claim:

1. A power transmission assembly comprising a rotatable housing member having a longitudinal bore, a rod longitudinally slidably received in said bore, a permanent magnet affixed to said housing having a plurality of radially disposed pole faces aligned concentrically with said bore at one end of said housing, a paramagnetic member rotatably carried in substantial alignment with said pole faces, and a nonmagnetizable member between said paramagnetic member and said pole faces and rotatably mounted in said bore means to prevent rotational while allowing longitudinal movement between said housing and rod, and means responsive to longitudinal movement of said rod with respect to said housing to rotate said nonmagnetizable member with respect to said housing, said nonmagnetizable member carrying a plurality of paramagnetic shunt elements disposable in variable magnetic linking relationship with said pole faces by rotation between said poles and said paramagnetic member, whereby the intensity of the magnetic flux passing from said poles to said paramagnetic member may be controlled by the relative position of said shunt elements with respect to said poles.

2. The assembly of claim 1 wherein said responsive means comprises a projection on one of said paramagnetic and non-magnetizable member and a diagonal groove in the other of said members for receiving said projection.

3. The assembly of claim 1 including rotational speed responsive means to impart relative movement between said housing member and rod to maintain said housing member and rod rotating at a given speed.

4. The assembly of claim 3 wherein the rotational speed responsive means comprises at least one lever having one end pivoted to the housing member, at least one second lever pivotally attached at one end to said rod, one of each of said pairs of levers having its other end pivotally attached to said other lever intermediate its ends, and a centrifugally movable weight on the other lever end projecting beyond the connection between each pair of levers.

References Cited in the file of this patent

UNITED STATES PATENTS

| 2,470,249 | Karasick | May 17, 1949 |
| 2,503,916 | McIver | Apr. 11, 1950 |
| 2,591,463 | Parker | Apr. 1, 1952 |
| 2,717,675 | Smith | Sept. 13, 1955 |

FOREIGN PATENTS

| 1,043,043 | France | June 10, 1953 |